US 7,842,178 B2

(12) United States Patent
Leddy et al.

(10) Patent No.: US 7,842,178 B2
(45) Date of Patent: Nov. 30, 2010

(54) MAGNET INCORPORATED ELECTRICALLY CONDUCTIVE ELECTRODES

(75) Inventors: Johna Leddy, Iowa City, IA (US); Angela Wolf, Coralville, IA (US); Drew Dunwoody, N. St. Paul, MN (US); Wayne Gellett, Ballwin, MO (US); Murat Ünlü, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 11/405,268

(22) Filed: Apr. 17, 2006

(65) Prior Publication Data
US 2007/0056849 A1   Mar. 15, 2007

Related U.S. Application Data

(60) Provisional application No. 60/672,259, filed on Apr. 18, 2005.

(51) Int. Cl.
*C25B 11/00* (2006.01)
*C25B 11/04* (2006.01)

(52) U.S. Cl. .................. 205/339; 204/242; 204/252; 204/290.01

(58) Field of Classification Search .................. None
See application file for complete search history.

(56) References Cited

U.S. PATENT DOCUMENTS

| | | | |
|---|---|---|---|
| 4,217,185 A * | 8/1980 | Kyriacou et al. ............ 205/426 |
| 5,162,169 A | 11/1992 | Tomantschger et al. |
| 5,240,569 A | 8/1993 | Waldron |
| 5,489,493 A | 2/1996 | Urry |
| 5,505,823 A | 4/1996 | Rendall |
| 5,645,716 A | 7/1997 | Izaauirre-Martinebet et al. |
| 5,704,118 A | 1/1998 | Kaneko et al. |
| 5,786,040 A | 7/1998 | Leddy et al. |
| 5,817,221 A | 10/1998 | Leddy et al. |
| 5,869,200 A | 2/1999 | Nunnally |
| 5,871,625 A | 2/1999 | Leddy et al. |
| 5,928,804 A | 7/1999 | Leddy et al. |
| 5,963,417 A | 10/1999 | Anderson et al. |
| 5,981,095 A | 11/1999 | Leddy et al. |

(Continued)

FOREIGN PATENT DOCUMENTS

DE   1 219 129   6/1966

(Continued)

OTHER PUBLICATIONS

De Nora, Industry Watch: VERONICA and TINOR 2000; New Technologies for Aluminum Production; The Electrochemical Society Interface; Winter 2002; pp. 20-24; vol. 11, No. 4.

*Primary Examiner*—Harry D Wilkins, III
(74) *Attorney, Agent, or Firm*—Foley & Lardner LLP

(57) ABSTRACT

An electrically conducting electrode having a composite and a current collector in electrical contact with the composite, the composite can comprise at least about 10 weight percent electrically conductive particles, at least about 0.5 weight percent magnetic particles, and an optional polymeric binder, wherein composite is at least about 80 weight percent with respect to the combined weight of the electrically conductive particles, the magnetic particles and the binder. Electrochemical systems can effectively use these electrodes to improve system performance.

23 Claims, 9 Drawing Sheets

U.S. PATENT DOCUMENTS

| | | |
|---|---|---|
| 6,001,248 A | 12/1999 | Leddy et al. |
| 6,207,313 B1 | 3/2001 | Leddy et al. |
| 6,207,322 B1 | 3/2001 | Kelsey et al. |
| 6,254,783 B1 | 7/2001 | Wurzburger et al. |
| 6,303,242 B1 | 10/2001 | Leddy et al. |
| 6,322,676 B1 | 11/2001 | Leddy et al. |
| 6,355,166 B1 | 3/2002 | Amarasinghe et al. |
| 6,375,885 B1 | 4/2002 | Leddy et al. |
| 6,479,176 B2 | 11/2002 | Leddy et al. |
| 6,514,575 B2 | 2/2003 | Leddy et al. |
| 6,521,377 B2 | 2/2003 | Ogasawara et al. |
| 6,855,241 B2 | 2/2005 | Palmer |
| 6,890,670 B2 | 5/2005 | Leddy et al. |
| 7,081,366 B2 | 7/2006 | Sullivan et al. |
| 2002/0056650 A1* | 5/2002 | Ray et al. .................... 205/387 |
| 2002/0118505 A1 | 8/2002 | O'Brien |
| 2003/0011965 A1 | 1/2003 | Shiue et al. |
| 2003/0232223 A1 | 12/2003 | Leddy et al. |
| 2004/0020785 A1* | 2/2004 | Minteer ....................... 205/339 |
| 2004/0026253 A1 | 2/2004 | Leddy et al. |
| 2004/0029166 A1 | 2/2004 | Fan |
| 2004/0050785 A1 | 3/2004 | Nguyen et al. |
| 2004/0131889 A1 | 7/2004 | Leddy et al. |
| 2004/0137283 A1 | 7/2004 | Leddy et al. |
| 2004/0195089 A1 | 10/2004 | O'Brien |
| 2004/0203166 A1 | 10/2004 | Sullivan |
| 2004/0234767 A1 | 11/2004 | Leddy et al. |
| 2004/0241884 A1 | 12/2004 | Sullivan et al. |
| 2006/0177879 A1 | 8/2006 | Mayes et al. |
| 2007/0003975 A1 | 1/2007 | Imamura et al. |
| 2007/0009771 A1 | 1/2007 | Leddy et al. |
| 2007/0027291 A1 | 2/2007 | Nano et al. |
| 2007/0054315 A1 | 3/2007 | Imamura et al. |

FOREIGN PATENT DOCUMENTS

| | | |
|---|---|---|
| EP | 1 388 588 A1 | 2/2004 |
| GB | 2 393 728 A | 4/2004 |
| JP | 61-219179 | 9/1986 |
| JP | 63-161015 | 7/1988 |
| JP | 04-209689 | 7/1992 |
| JP | 04-222887 | 8/1992 |
| JP | 05-120914 | 5/1993 |
| JP | 06-084974 | 3/1994 |
| JP | 09-095651 | 4/1997 |
| JP | 63-161014 | 7/1998 |
| JP | 11-287779 | 10/1999 |
| JP | 2002-298646 | 10/2002 |
| JP | 2003-147046 | 5/2003 |
| JP | 2004-158551 | 6/2004 |
| JP | 2004-186144 | 7/2004 |
| WO | WO 02/056325 A1 | 7/2002 |
| WO | WO 2004/097416 A1 | 11/2004 |
| WO | WO 2004/097417 A1 | 11/2004 |

* cited by examiner

SLOPE $|i_p|$ VS. $v^{1/2}$ NORMALIZED BY DOUBLE LAYER CAPACITANCE

CYCLIC VOLTAMMOGRAMS: CURRENT NORMALIZED BY DOUBLE LAYER CAPACITANCE; V = 10 mV/s

A: M1-M4 MAGNET SERIES
B: A1-A4 NON-MAGNET SERIES
C: B1-B4 BLANK SERIES

MAGNET INCORPORATED ELECTRICALLY CONDUCTIVE ELECTRODES

RELATED APPLICATIONS

The present application claims priority to U.S. Provisional Application No. 60/672,259 to Leddy et al., entitled "Magnet Incorporated Carbon Electrodes (MICE)," filed Apr. 18, 2005, which is incorporated herein in its entirety by reference.

STATEMENT REGARDING FEDERALLY SPONSORED RESEARCH

The work described herein is funded in part through the Army Research Office under Contract Number DAAD19-02-1-0443. The Government may have certain rights to this invention.

FIELD OF THE INVENTION

The present invention relates to electrodes formed with electrically conductive powders in a binder. More particularly, the present invention relates to electrically conductive electrodes having magnetic material incorporated therein.

BACKGROUND OF THE INVENTION

Carbon electrodes have been used in many commercial applications, including aluminum refining, steel making, chlorine and fluorine production, water decontamination and purification, and various analytical and bioanalytical chemistry applications. Such electrodes can be formed of various forms of carbon, such as pyrolytic graphite, carbon fibers, and glassy carbon powders. These electrodes are commonly used in processes that are very energy intensive.

SUMMARY OF THE INVENTION

By including magnetic materials in electrically conducting electrodes, desirable electrode performance can be obtained. For example, magnetically modified carbon electrodes have higher electrochemical flux through their electroactive area than equivalent unmodified carbon paste electrodes. Thus, the magnetic modified conducting electrodes can have enhanced performance in many applications. While not wanting to be limited by theory, the higher electrochemical flux is thought to result from the local magnetic effects on electron transfer rates.

In a first aspect, the invention pertains to an electrochemical cell comprising a tank, a first electrode, a second electrode, an electrical connection with an emf source to provide an emf across the electrodes, and a solution within the tank in effective contact with the first electrode and the second electrode, wherein the solution comprises reactants that can form product compositions in response to the emf. At least one of the first electrode and the second electrode is a magnetically modified electrode comprising a composite. In some embodiments, the magnetically modified electrode further comprises a current collector in electrical contact with the composite. Also, the composite generally comprises at least about 10 weight percent electrically conductive particles, at least about 0.5 weight percent magnetic particles, and an optional binder, which can be a polymeric binder, a viscous oil, combinations thereof or the like. Furthermore, in some embodiments the composite comprises at least about 80 weight percent with respect to the combined weight of the electrically conductive particles, the magnetic particles and the binder.

In a further aspect, the invention pertains to an electrode having a non-porous composite comprising an electrically conductive matrix and magnetic particles. In some embodiments, the electrode can exhibit a higher electrochemical flux at the electrode surface relative to comparable electrodes without magnetic modification. Electronically conducting matrix comprises electrically conductive material and can further comprise a binder, such as mineral oil, polyolefins, epoxy, and the like. The binder can retain the conducting materials in proximity and can also enable the electrode to generally comprise a self-supporting structure.

In another aspect, the invention pertains to an electrically conductive electrode comprising at least about 10 weight percent electrically conductive particles, magnetic particles and a surface coating of electrical conductor covering at least about 20 percent of the electrode surface area.

Moreover, the invention pertains to a method for performing electrochemical reactions. The method comprises transporting electrons involved in the electrochemical reactions through an electrochemically inert electrode comprising at least about 10 weight percent electrochemically inert, electrically conductive particles and at least about 0.5 weight percent magnetic particles. Specifically, the electrochemically inert electrode is electrochemically inert under the conditions of the electrochemical reactions.

Additionally, the invention pertains to an electrochemical cell comprising a tank, a first electrode, a second electrode, an electrical connection with an emf source to provide an emf across the electrodes and a solution within the tank in effective contact with the first electrode and the second electrode. The solution comprises an electrolyte and reactants that can form product compositions in response to the emf. At least one of the first electrode and the second electrode is a magnetically modified electrode comprising a composite comprising electrically conductive particles and magnetic particles. The magnetically modified electrode exhibits an electrochemical flux per unit electroactive area at least about 20% relative to an equivalent electrochemical cell without magnetic particles within the electrode.

In additional aspects, the invention pertains to a electrochemical cell comprising a first vessel, a second vessel, an ion conduction pathway connecting the first vessel and the second vessel, a solution in the first vessel comprising a first reactant and an electrolyte, a solution in the second vessel comprising a second reactant and an electrolyte, a first electrode in contact with the solution in the first vessel, a second electrode in contact with the solution in the second vessel, and an electrical connection connecting the first electrode and the second electrode. At least one of the first electrode and the second electrode is a magnetically modified electrode comprising an electrically conductive material and a magnetic material. The magnetically modified electrode is electrochemically inert under the conditions of the reaction of the first reactant and the second reactant.

DETAILED DESCRIPTION OF THE INVENTION

Figure 1:
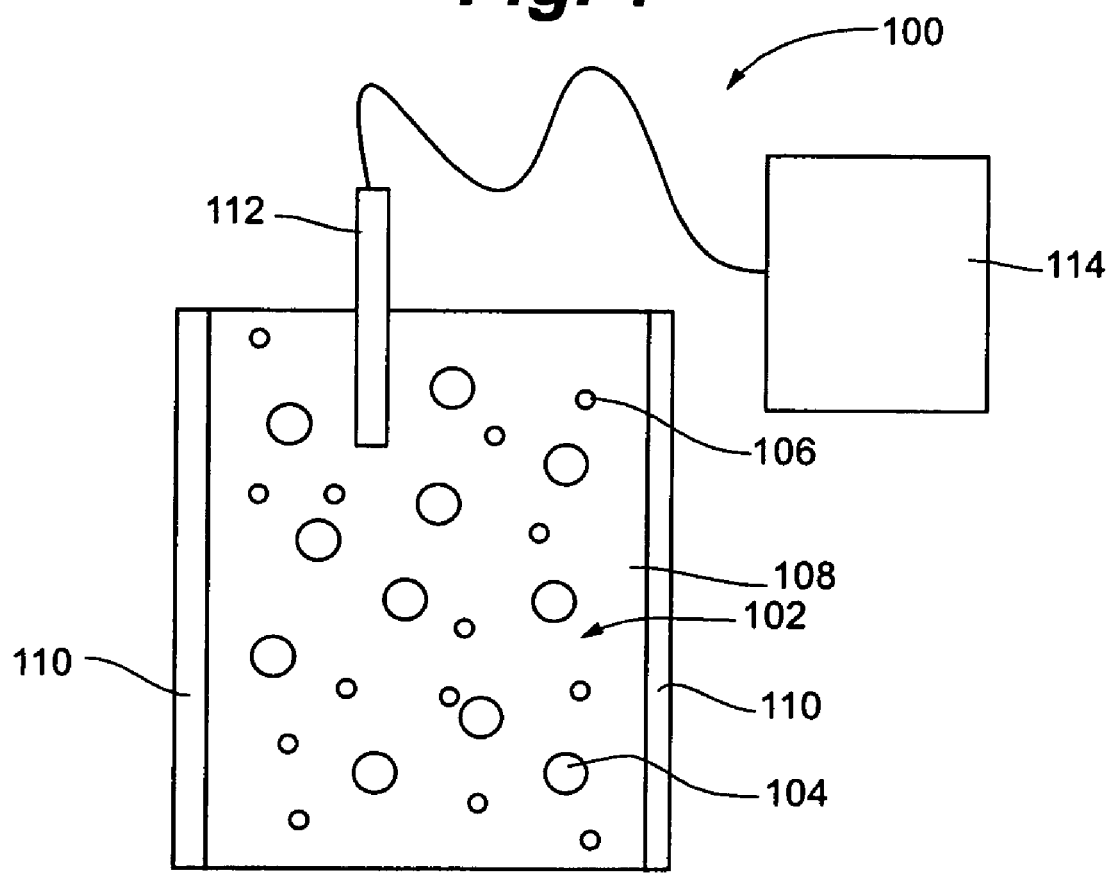
FIG. 1 is a schematic view of a magnet incorporated conductive electrode.

Magnetic modification of carbon-based electrodes or other electrodes filled with electrically conductive particles improves the performance of the electrodes. In some embodiments, electrically conductive powders, such as carbon powders, can be mixed with magnetic particles within a binder. With respect to the improved performance of these electrodes, magnetic effects due to the presence of magnetic particles enhance the current flux at the electrode surface. Thus, the efficiency of the electrode is enhanced, as a larger current per unit area can be achieved. This increased current flux can result in reduced energy consumption for electrochemical product processes utilizing the electrodes. Carbon particles, such as graphite, carbon black and other electrically conductive carbon particles, are of significant commercial interest, but other electrically conductive particles can be used, such as metal powders or a combination of electrically conductive powders. Similarly, electrically conductive polymers can be used in the electrodes.

Magnetic fields can influence chemical systems through influences on electron transport. Effects on transport, including magnetohydrodynamics and gradient magnetic field effects, have been achieved by placing electrodes in an externally applied magnetic field. Incorporating a permanent magnetic field at the electrode surface can provide further advantages, such as increasing the electrochemical flux at an electrode surface. Incorporating a permanent magnet field at the electrode surface has been accomplished by applying a suspension of polymer coated magnetic particles and a perfluorinated sulfonic acid cation exchange polymer (e.g., Nafion®, DuPont) in an aliphatic alcohol to an electronically conducting substrate (electrode).

However, such electrodes with a surface coating of magnetic particles can be sensitive to relative humidity conditions, which can impact their microstructure. In addition, the surface coated electrodes generally only enable evaluation of neutral and cationic species. The surface coated electrodes may not be stable for extended periods in non-aqueous solvents conventionally used in electrochemical systems due to swelling that can reduce the structural integrity of the surface coating. Further, electrodes having electrically conducting surfaces modified with magnetic microparticles and an ion exchange polymer generally can have reproducibility challenges. Such reproducibility challenges generally can be attributed to factors such as sensitivity to air moisture, charge selectivity, and relative instability in nonaqueous solvents. Mechanical stability of the electrodes can also be compromised as the loading of magnetic microparticles increases above about 15% in some embodiments of the surface magnetic coatings.

While not wanting to be limited by theory, electrical conductivity in materials is often discussed in terms of electron percolation in which electrons percolate from site to site. With respect to the present materials, electrons can be considered to percolate between electrically conductive particles. Generally, at least a particular density of percolation centers provides an open electrical conduction pathway through the material. A randomly distributed distribution of electrically conductive centers provides a particular estimate of a lower limit of density of conduction centers to provide an electrical conduction pathway. However, the presence of magnetic particles during the electrode formation may align some of the magnetic particles forming a local magnetic field, and in some embodiment may align magnetic particles with electrically conductive particles due to surface interactions. The interactions of the particles may induce local order within the materials so that conduction pathways can be present at lower densities of conductive particles than are present in a randomly distributed composite. However, in general within the composites, the magnetic particles and electrically conductive particles are interspersed within the composite either randomly or with some local order.

As described herein, magnetic incorporated conductive electrodes ("MICE") comprise an electrically conductive composite, which comprises an electronically conducting matrix modified with magnetic particles. The matrices can comprise a binder, such as mineral oil, epoxy, parafin wax, silicone grease, petroleum jelly, PTFE (Teflon®) powder, to form carbon pastes or conductive polymer composites, respectively. However, in some embodiments, a binder is not included, and the matrices comprise elemental metals or alloys thereof, or electrically conductive polymers or combinations thereof. Electrically conductive polymers include, for example, polyacetylene, polyaniline, poly(sulfur nitride), poly(p-phenylene), polypyrrole and the like, which can include selected dopants to introduce the desired level of electrical conductivity. The MICE construction enables an array of electrode configurations (e.g., ratio of mass or volume of the magnetic particles to conductor) that are otherwise generally not practical in other magnetically modified electrodes. The MICE can further comprise a current collector in electrical contact with the electrically conductive composite. Some representative compositions for the electrically conductive composites are described herein. The reference to a composite indicates that the components are interspersed within the composite in contrast with a layered material or the like. However, while the components are interspersed, they may not be randomly distributed due to forces between component species which alter the distribution of species during formation of the composite and possibly during subsequent processing.

As compared to nonmagnetic electrodes, such as carbon paste electrodes (CPE), MICE can exhibit enhanced electrochemical flux (i.e., larger current per unit area of electrode surface) than electrodes prepared with no magnetic content.

In general, a larger current per unit area of electrode surface without an increased expenditure of energy results in higher electrode efficiency. Correspondingly, this higher electrode efficiency results in reduced energy consumption with respect to the same production amounts. Given high energy costs, a reduction in energy consumption for a given production amount can be an important commercial improvement. In general, the systems involving the improved electrodes described herein use the electrodes to supply current while the electrode is inert for the particular chemical processes taking place so that the electrode basically provides the selected electromotive force (emf) for driving the reaction. The external emf can be supplied by a battery, a transformer connected to line voltage, a generator, combinations there or the like. For the formation of chemical sensors, one or more MICE electrodes can be associated with chemically sensitive components to provide the selected chemical sensitivity, as described further below. In some embodiments, it is desirable to use one MICE electrode with a non-magnetic electrode for analyte analysis or detection. Electrodes with magnetic coatings, in contrast with the electrically conducting composites described herein, are described in U.S. Pat. No. 6,207,313 to Leddy et al., entitled "Magnetic Composites and Methods for Improving Electrolysis," incorporated herein by reference.

In other systems, the reactants are spontaneously reactive. However, the inert MICE electrodes can still effectively increase the reaction rates for more efficient product formation. In general, these types of reactions for the production of desired chemical products are similar to the reactions described that are driven through an external emf, except that the two reactants are necessarily kept separate from each other so that the products can be collected. The electrodes then have an electrical connection to each other to provide for the reduction-oxidation reactions at the respective electrodes. A salt bridge or other ion conduction pathway can provide for electrical neutrality in view of the electron flow.

In addition, as compared to electrodes having conducting surfaces modified with magnetic microparticles, MICE enable establishing magnetic fields at an electrode surface in a more robust matrix than that provided by magnetic microparticles embedded in an ion exchange polymer on the surface of an electrode. Such robust electrodes can be useful in high-current, industrial processes, such as aluminum refining and generation of basic chemicals including chloralkali, in which the ion exchange polymer/magnetic microparticle electrodes are unlikely to be stable under high flux and higher temperature conditions. Also, under certain conditions, MICE can be more sensitive to an analyte or interferent of interest, thus making the electrode more selective and sensitive. In some cases, comparison of the response at magnetic and nonmagnetic electrodes can enhance sensitivity towards an analyte.

The improved electrodes described herein can exhibit improved performance in electochemical cells. In particular, the electrodes can exhibit increased current per active area of the electrodes. Specifically, the improved electrodes can exhibit an electrochemical flux per electroactive area at least about 40% greater, in some embodiments at least about 70% greater and in additional embodiments at least about 100% greater than equivalent electrodes without the magnetic particles. A person of ordinary skill in the art will recognize that additional ranges within the specific ranges of electrode performance are contemplated and are within the present disclosure. The electrochemical flux can be estimated to be proportional to the current normalized by the double layer capacitance. The double layer capacitance is proportional to the electroactive area which is related to the electrode surface area in contact with the electrolyte. The evaluation of the double layer capacitance is discussed in detail in the Examples below.

MICE Structure and Composition

As described above, improved electrodes have magnetic particles associated with the electrode. Magnetizable particles can be incorporated into electrochemical electrodes to influence the properties, especially the electrochemistry, of an electrolytic species. Rate effects on electrode chemistry is described further in U.S. Pat. No. 6,890,670 to Leddy et al., entitled "Magnetically Modified Electrodes as Well as Methods of Making and Using the Same," which is incorporated herein by reference. However, as described herein, it has been discovered that magnetic particles can improve the electrical flux of electrodes that are transferring electrons without undergoing electrochemical reaction. Magnetic materials are materials that develop a stable magnetic moment following exposure to a strong magnetic field for a sufficient period of time. Examples of magnetic materials include, for example, permanent magnetic materials, ferromagnetic materials, ferrimagnetic materials, superconducting materials and combinations thereof.

Referring to FIG. 1, a representative MICE 100 is depicted schematically. MICE 100 broadly includes a composite comprising an electrically conducting matrix 102 and magnetic particles 104 incorporated therein. Magnetic particles 104 can be selected, for example, from the group consisting of $Sm_2Co_{17}$, $SmCo_5$, NdFeB, $Sm_2Co_7$, $La_{0.9}Sm_{0.1}Ni_2Co_3$, $Ti_{0.51}Zr_{0.49}V_{0.70}Ni_{1.18}Cr_{0.12}$, $Fe_3O_4$, $Fe_2O_3$, and any combination thereof. Several factors contribute to the overall magnitude of the magnetic enhancement effects. One factor is the strength of the magnetic field in the electrodes, and the effect on susceptible species is generally proportional to the magnitude of the field. Similarly, the magnitude of the effect is also generally proportional to the magnetic susceptibility or g-factor of the reactants. In principle, the factors can be used to tune the effect to provide greater flexibility with respect to the desired magnetic effect for a particular system since the greatest magnitude of magnetic enhancement is not necessarily desired in all applications.

Electrically conducting matrix 102 can comprise electrically conductive particles 106 therein and can further comprise a binder 108. The binder 108 can retain the conducting materials in proximity and can also enable the electrode to generally comprise a self-supporting structure. Suitable binders generally comprise organic polymers, silicon-based polymers or combinations thereof. Suitable organic polymers include, for example, polyolefins, epoxies, polycarbonates, polyamides, copolymers thereof, mixtures thereof and the like. Suitable silicon-based polymers include, for example, silicone polymers.

In general, the shape and size of the electrodes are selected appropriately for the particular applications. However, for many applications, the magnet incorporated conductive electrode has certain features that make it suitably durable for commercial applications. In some embodiments, the composite portion of the electrode has an average thickness of at least about 1 millimeter (mm), in further embodiments at least about 5 millimeters and in additional embodiments at least about 1 centimeter. A person of ordinary skill in the art will recognize that additional ranges within the explicit ranges above are contemplated and are within the present disclosure.

In some embodiments, MICE 100 comprises a thin surface coating 110 of an electrically conductive material, such as elemental metal or alloys thereof. The surface coating can cover all or a portion of the electrode surface. For example, the surface coating can cover, at least 20 percent, at least 40 percent or in further embodiments at least about 60 percent of the electrode area. The coating thickness can be selected to provide a desired degree of durability and surface stability to the structure or to provide improved electrical conductivity. In some embodiments, surface coating 110 has an average thickness of at least about 5 microns, in other embodiments at least about 0.1 millimeters (mm), in further embodiments at least about 0.25 mm, and on additional embodiments from about 0.5 mm to about 1 centimeter. A person of ordinary skill in the art will recognize that additional ranges of area coating and average thickness within the explicit ranges above are contemplated and are within the present disclosure. The surface coating can be applied using appropriate approaches, such as electroplating, sputtering and the like.

Also, MICE can comprise a current collector 112 to facilitate electrical connection of the electrode with an external circuit 114 as well as to reduce the internal impedance of the electrode. Suitable current collectors include, for example, metal (e.g., copper) nails, elemental metal foils, metal grids, or the like. Current collector 112 generally should be formed from an inert metal, such as nickel, or of a carbon material, such as carbon cloth. In addition, the current collector can also provide a support for holding the electrode.

As described above, electrically conducting matrix 102 can comprise a binder, such as, for example, mineral oil, epoxy, polyolefins, and the like to form a conductive paste (such as carbon paste) or a conductive epoxy. Conductive paste generally comprises a relatively thick dispersion of particles (e.g., carbon particles) in a paste dispersant. Conductive epoxy generally comprises an epoxy (e.g., mixed epoxy resin and hardener) with electrically conductive particles dispersed therein. In other embodiments, electronically conducting matrix 102 does not comprise a binder and can be formed to be a pressed electrode comprising conductive particles comprising elemental metals and alloys thereof. In embodiments with and without a binder, the electrically conductive metal particles can comprise a coating of an electrical conductor.

In general, electrical conductivity of a material depends on the particular conditions. In particular, some materials may be electrically conducting at higher temperatures, which are not electrically conductive at room temperature. As used herein, in the context of the description of an electrochemical cell, the electrically conductive material refers to a material that is electrically conductive at the conditions of cell operation. Thus, some materials that are electrically semiconducting or electrically insulating at room temperature and pressures may be useful to form magnetically modified conductive electrodes. Thus, in other embodiments that are intended for use at other than room conditions, materials that can be used include, for example, room temperature semiconductors, semimetals, doped diamonds, and diamond films. For example, an exceptionally hard electrically conducting material, such as electrically conductive diamond, can enable use of MICE under harsh conditions that can be encountered in various manufacturing processes.

Once the composite materials (electrically conductive particles, magnetic particles, and optional binder) are mixed, the electrode can comprise at least about 10 weight percent conductive materials, in further embodiments at least about 20 weight percent conductive materials, in other embodiments from about 25 weight percent to about 98 weight percent conductive materials and in additional embodiments from about 30 weight percent and about 95 weight percent conductive materials. Furthermore, the composite materials can comprise at least about 0.5 weight percent magnetic particles, in further embodiments at least about 5 weight percent magnetic particles, in other embodiments from about 10 weight percent to about 50 weight percent magnetic particles and in additional embodiments from about 15 weight percent to about 35 weight percent magnetic particles. While use of a binder in the composite may be optional, if a binder is present, the composite can comprise at least about 1 weight percent binder, in further embodiments at least about 2.5 weight percent binder, in other embodiments at from about 5 weight percent to about 30 weight percent and in additional embodiments from about 10 weight percent to about 25 weight percent binder. The electrode can generally comprise at least about 80 weight percent of conductive materials, magnetic materials, and optional binder, in further embodiments at least about 85 weight percent and in additional embodiments at least about 90 weight percent, although effectively the entire composite can comprise conductive materials, magnetic materials and binder. A person of ordinary skill in the art will recognize that additional ranges of composition within the explicit ranges given above are contemplated and are within the present disclosure. The composite can comprise additives, such as viscosity modifiers, antioxidants, colorants, other suitable additives and combinations thereof, generally in quantities of no more than about 5 weight percent each.

Overview of Representative Embodiments

As described above, MICE broadly comprise a composite comprising an electronically conducting matrix and magnetic particles incorporated therein. The composite can further comprise an optional binder. The composite forms an electrically conductive structure. Generally, MICE further comprise a current collector in electrical contact with the composite. The current collector can provide for connection of the electrode with an external circuit. Various embodiments can be adapted for a particular application. A few representative embodiments are presented below.

The MICEs described herein include, for example, magnetic incorporated conductive electrodes wherein the electronically conducting matrix is a conductive paste (MICE-Paste) having conductive particles dispersed therein, magnetic incorporated conductive electrodes wherein the electronically conducting matrix is pressed conductive particles (MICE-Pressed), and magnetic incorporated conductive electrodes wherein the electronically conducting matrix is conductive epoxy (MICE-Epoxy) having conductive particles dispersed therein. While MICE-Paste and MICE-Epoxy electrodes generally comprise a binder in the electronically conducting matrix (such as mineral oil and epoxy, respectively), MICE-Pressed electrodes comprise an optional binder.

Magnetically Modified Carbon Paste Electrodes

Figure 2:
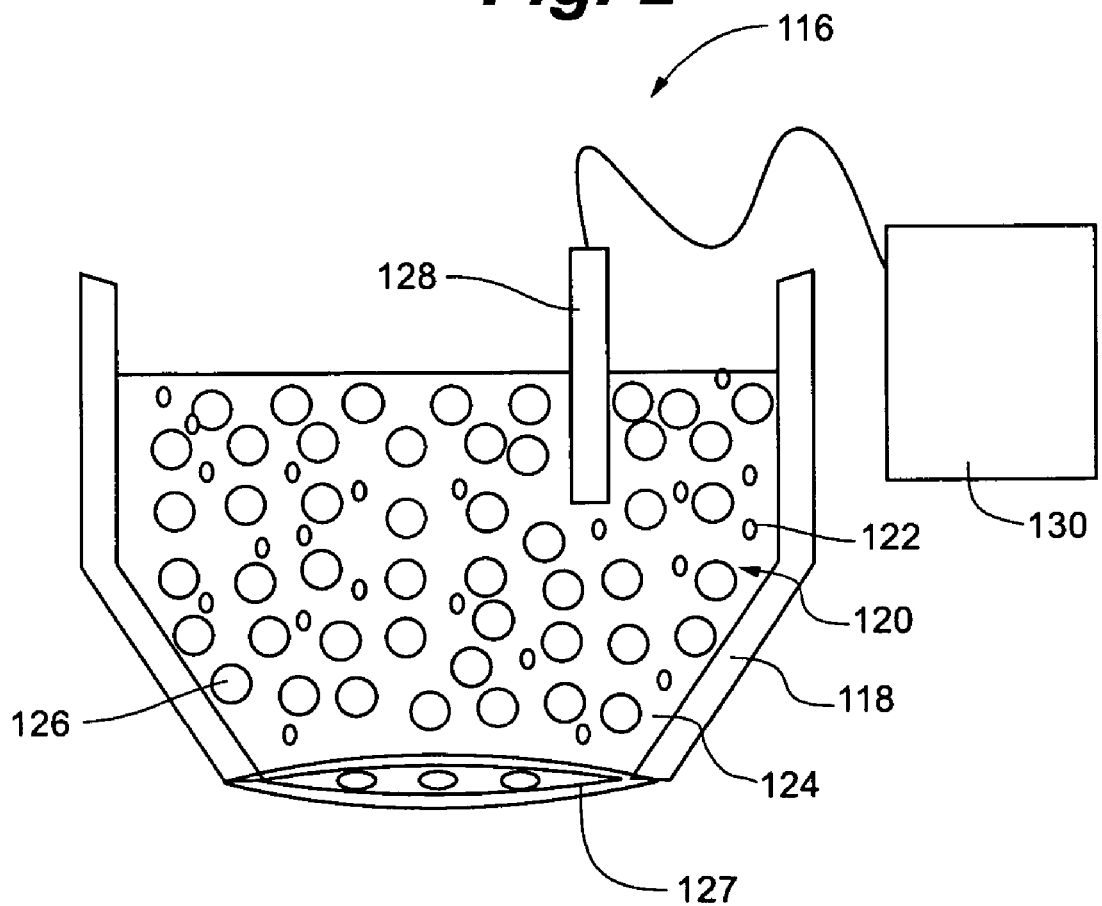
FIG. 2 is a schematic view of a magnet incorporated conductive electrode.

Referring to representative embodiments in FIG. 2, MICE-Paste electrode 116 comprises a cylinder 118 and a carbon paste mixture 120. Carbon paste mixture 120 comprises carbon particles 122, a binder 124 of mineral oil, and magnetic particles 126. Mixture 120 is held within cylinder 118. Cylinder 118 comprises an opening 127 that provides for electrical contact with carbon paste mixture 120, for example, if cylinder 118 is place din contact with an electrolyte. A platinum wire 128 or other convenient current collector can be inserted into carbon paste mixture 120 to electrically connect the carbon paste mixture 120 and an external control device 130, such as a potentiostat or power source. While a support structure in the form of a tube is described with respect to FIG. 2, other shaped support structures can be used for the conductive paste mixture as long as appropriate mechanical support is provided to the paste and suitable electrical contact is provided.

Magnetically Modified Epoxy Carbon Electrodes

Epoxy carbon electrodes can be prepared in a similar manner to MICE-Paste, although the electronically conducting matrix is generally an epoxy that is mixed with an electrical conductor and, following construction of the electrode, enabled to cure until the matrix is solid. Since the resulting structure is a cured polymer, the structure may not have any further support for mechanical stability. Magnetically modified epoxy carbon electrodes are generally rigid conducting composites comprising electrically conducting graphite powder and siloxane coated magnetic particles suspended in a chemically inert polymer matrix. However, other conductive powder or combinations of powders can be substituted for the graphite powder. The electrode materials are generally fixed within a low viscosity epoxy. However, other polymers can be used as desired.

In some embodiments, the resulting polymer structure is substantially non-porous such that fluids or compositions from a fluid cannot penetrate through the electrode. Thus, if the electrode is substantially non-porous and inert, the electrode can be stable for long periods of time in use. While being non-porous, an electrode can have a contoured surface to provide for a high surface area.

Magnetically Modified Carbon Pressed Electrodes

To make MICE-Pressed, the electrode materials generally are placed into a die or the like and compressed in a press under high pressure such that the materials adhere to one another. The electrode materials generally comprise electronically conductive material, magnetic particles, which can be coated with a chemically inert composition, and an optional binding agent.

MICE-Pressed can be constructed by shaping a pellet comprising the electrode materials. The pellet can be formed to make electrical contact with one or more conducting leads such as platinum metal or carbon cloth. The lead can be used to connect the electrode to control devices, such as a potentiostat. In some embodiments, Teflon® (polytetrafluoroethylene) powder is used as a binding agent comprising about 20 wt. % to about 40 wt. % of the pellet. The magnetic materials used in these electrodes can be the same magnetic microparticles previously mentioned. The magnetic material composition of the electrode can consist up to as much as 50% by weight. Graphite and glassy carbon powders or other electrically conductive powders or mixtures of powders can be used as the electronically conductive material.

Figure 3:
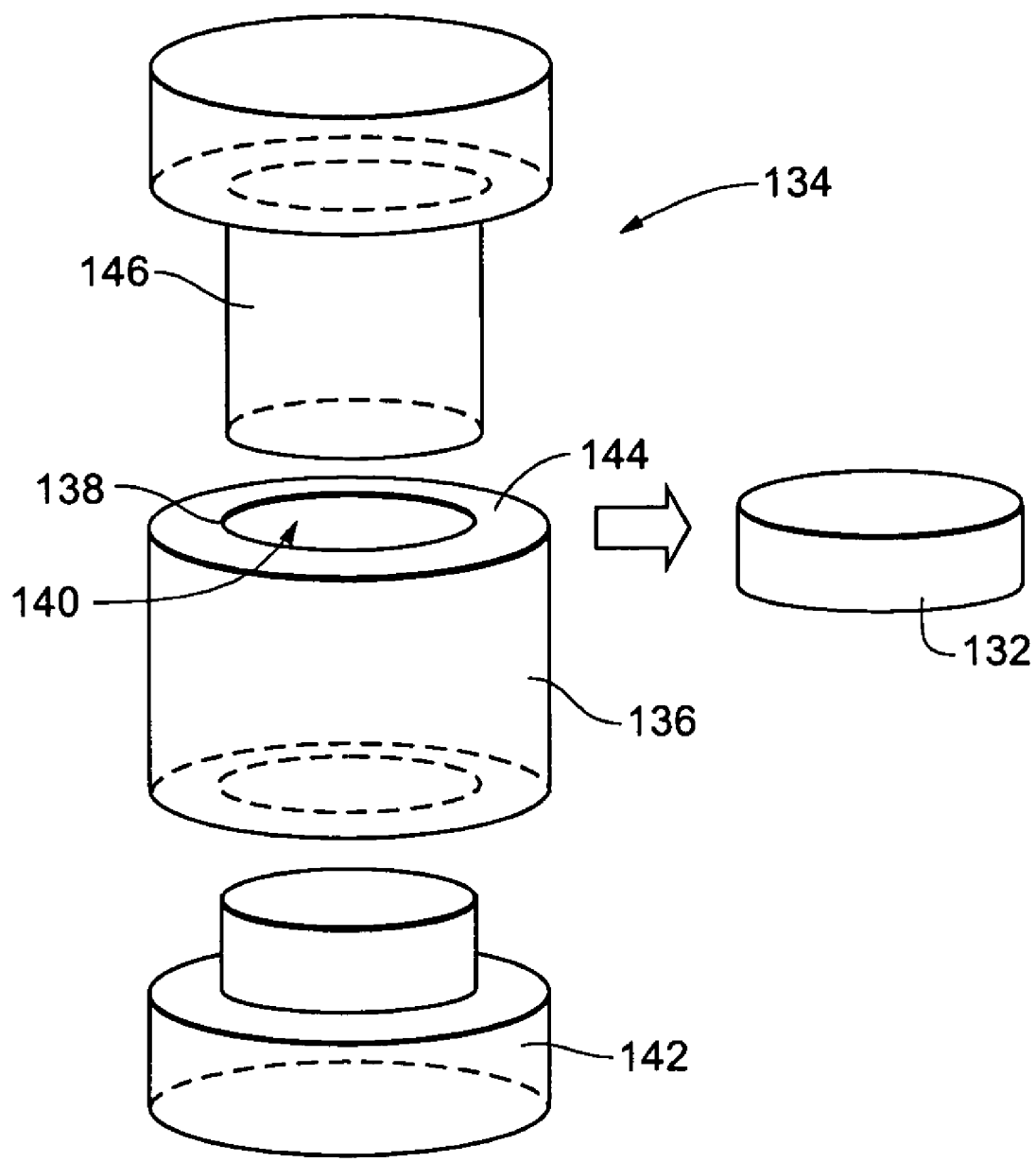
FIG. 3 is a schematic view of a die for making a pellet for a pressed magnet incorporated conductive electrode.

Referring to FIG. 3, a pellet 132 can be formed after the components are thoroughly mixed and placed into a die 134. The die comprises three stainless steel parts: (1) a cylinder 136 with inner diameter 138 forming a cavity 140, (2) a foot 142, and (3) a plunger 146 that can form a space in cavity 140.

To make pellet 132, foot 142 is placed inside cylinder 136 and the pellet components introduced into cavity 140. Plunger 146 is introduced into a top 144 of cylinder 136 and then die 134 and its components are placed into a hydraulic press (not depicted). Pressure is then applied to the die 134.

Figure 4:
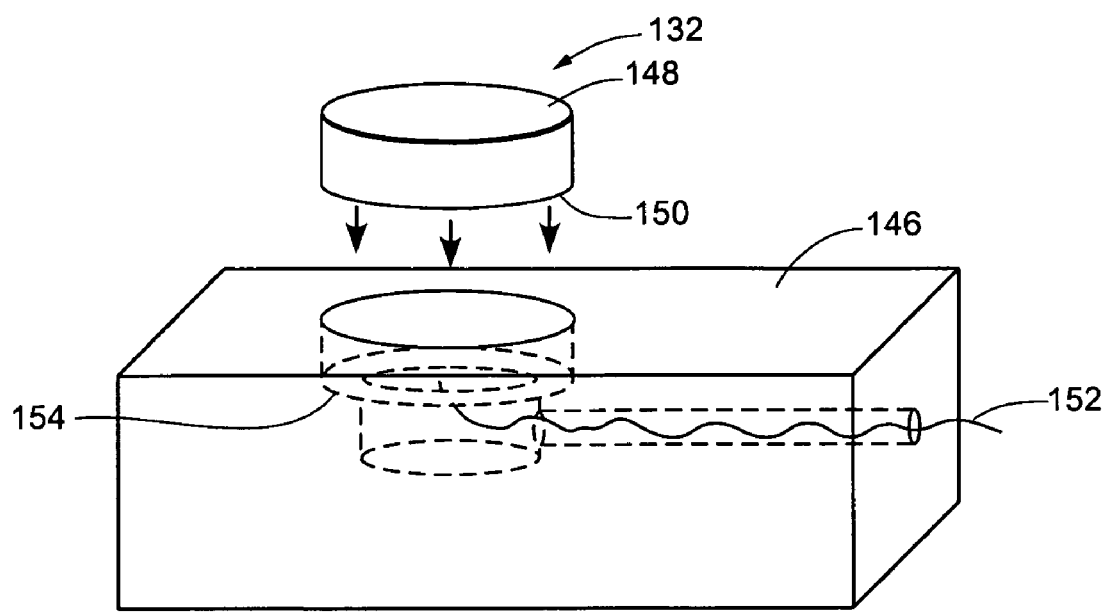
FIG. 4 is a schematic view of a pressed magnet incorporated conductive electrode.

Referring to FIG. 4, following formation, pellet 132 is fixed into a rigid polymer housing that can be made from Teflon®. The geometry of housing 146 can be such that a first face 148 of pellet 132 makes contact with the solution of an electrochemical cell while a generally opposed second face 150 of the pellet 132 is in contact with an electrical conductor 152. Epoxy 154 can be applied to a seam between the pellet 132 and Teflon® housing 146 to seal the electrode. Once the pellet 132 and electrical conductor 152 contact one another and the electrode is sealed, the MICE-Pressed is generally complete.

In MICE-Pressed, the electrical conductor and magnetic particles can be the same material and the binder can start as a monomer that was polymerized during or after formation of the MICE-Pressed.

MICE Applications

The magnetically modified electrically conductive electrodes described herein can provide improved performance as replacements for carbon electrodes in a range of applications. The MICE described herein can be used in conjunction with other equipment (e.g., potentiostat or power source) for various applications and to interact with various electrochemical systems. Such applications can include those in which carbon electrodes are currently being used. For example, carbon electrodes are currently being used in aluminum refining and steel making, chlorine and fluorine production, water decontamination and purification, and the like.

Carbon based electrodes are commonly used in analytical and bioanalytical chemistry applications. MICE can be used in analytical and bioanalytical measurements such as voltammetry, stripping analysis, amperometry, coulometry, potentiometry, chronopotentiometry, chemically modified surfaces, and kinetically based measurements. In addition, discriminating between two species with similar standard potentials but different g-values is another application. Such species include $O_2$ and NO.

Moreover, new processes increasing the efficiency of commercial processes that utilize large amounts of electricity (e.g., aluminum metal production) can be used to reduce costs associated with the production. This also enables the reduction of pollution that can be associated such production.

In analytical applications, magnetically modified carbon electrodes can enable the detection of molecules at lower concentrations than can currently be measured and the measurements of species currently undetectable at nonmagnetic electrodes. This is because the magnetically modified electrodes enable certain reactions that do not occur, or occur very slowly, in the absence of a magnetic field to be detected electrochemically. In some application, the discrimination of species with similar standard potentials but different g-values can be used where a dual sensor configuration comprises one magnetic electrode and one non-magnetic electrode.

With respect to electrolytic methods for production of chemical products, electrodes are generally placed in contact with a solution, molten salt or the like, comprising the reactants, i.e., precursors, that form the desired product. Traditional carbon electrodes can comprise solid blocks of graphite or graphite loaded within a polymer. The magnetic modified electrically conductive electrodes can be replacements for these traditional electrodes to provide for improved performance.

Figure 5:
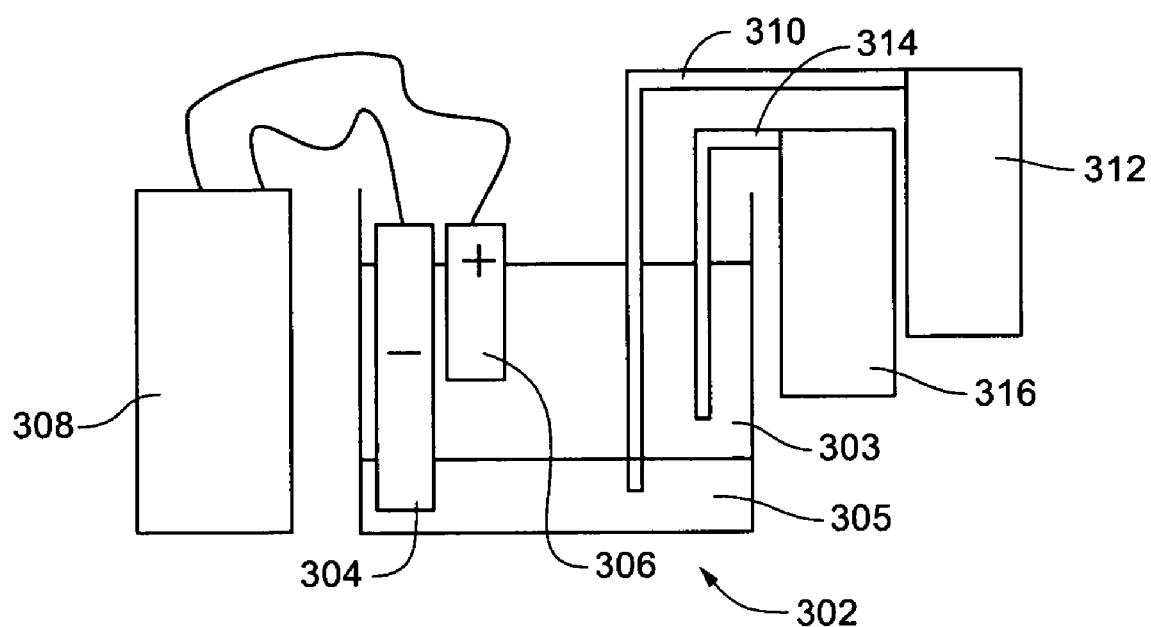
FIG. 5 is a sectional side schematic view of an electrochemical system with a magnet incorporated conductive electrode.

A wide range of configurations are suitable for using the electrodes described herein, which generally can be selected to be appropriate for a particular application. A representative configuration is schematically shown in FIG. 5. Referring to FIG. 5, electrolysis system 300 comprises a tank 302 comprising an electrolyte solution having reactants therein, a first electrode 304, a second electrode 306, a power source 308 connected to the electrodes, an material input 310 connected to a reactant reservoir 312, and a product output 314 connected to a product reservoir 316. In general, either electrode 304 or electrode 306, or both, can be magnetically modified electrodes as described herein. Power source 308 can be any suitable power source such as line voltage converted to a direct current.

The use of carbon electrodes for aluminum production that can be substituted with magnetically modified electrodes are described further, for example, in U.S. Pat. No. 6,855,241 to Palmer, entitled "Process and Apparatus for Smelting Aluminum," and U.S. Pat. No. 5,505,823 to Rendall, entitled "Method for the Electrolytic Production of Aluminum," both of which are incorporated herein by reference. Structured electrodes for sensor applications having embedded veins of carbon electrodes are described in U.S. Pat. No. 5,704,118 to Kaneko et al., entitled "Method of Making a Carbon Sensor Electrode," incorporated herein by reference. The magnetically modified electrode materials described herein can be substituted for the carbon electrode veins in the '118 patent. These representative examples point to a few of many possible applications in which the magnetically modified electrodes described herein can be effectively substituted for conventional carbon electrodes.

Similarly, the magnetically modified electrodes can be used in reactors for producing desired product compositions in which the reactants are spontaneously reactive. In order to control the reaction, the spontaneous reactants are kept physically separated. Such a configuration is shown schematically in FIG. 7. Reactor system 380 comprises a first reactant vessel 382, a second reactant vessel 384 and ion conduction channel 386. First reactant vessel 382 comprises a solution 388 comprising a first reactant and an electrolyte. Second reactant vessel 384 similarly comprises a solution 390 comprising a second reactant and an electrolyte. The first reactant and the second reactant are spontaneously reactive. Ion conducting channel 386 is generally a salt bridge or the like with an electrolyte that provides for ionic conduction between first reactant vessel 382 and the second reactant vessel 384. First electrode 392 is in contact with solution 384 in first reactant vessel 282. Second electrode 394 is in contact with solution 388 in second reactant vessel 384. First electrode 392, second electrode 394 or both can be a magnetically modified electrode as described herein that is electrochemically inert under the conditions of the reaction. Electrical connections 396 provide for electrical conduction between first electrode 392 and second electrode 394. An optional load 398, such as an electrical resistor, can provide for the control of current associated with the electrical conduction between the electrodes.

EXAMPLES

Figure 6:
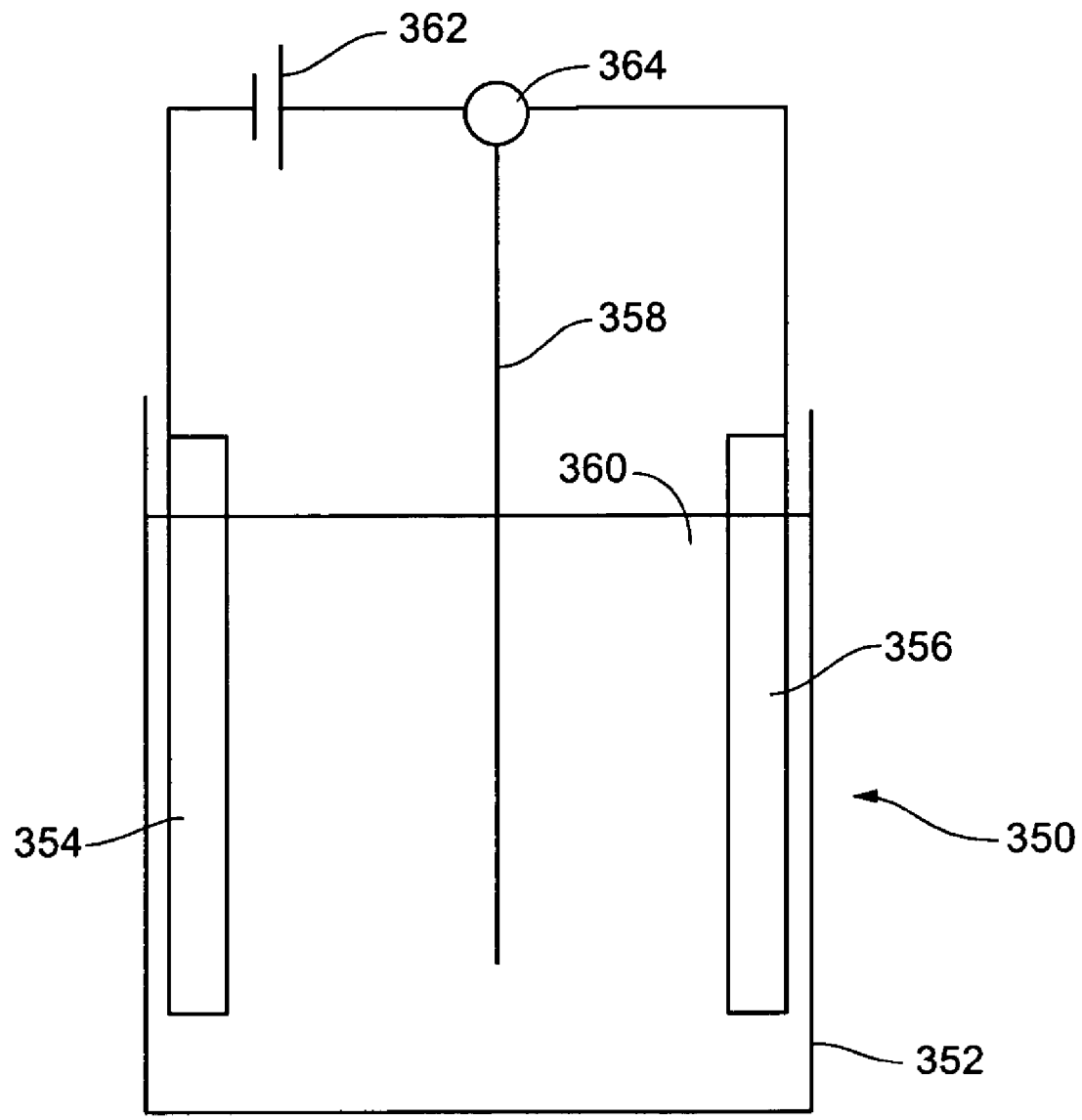
FIG. 6 is a sectional side schematic view of a three electrode electrochemical system with a magnet incorporated conductive electrode.

With respect to the Examples below that report electrode performance values, these were performed with a three electrode configuration of an electrochemical system. A three electrode configuration is shown schematically in FIG. 6. Three electrode system 350 has a tank 352, a first electrode 354, a second electrode 356, a reference electrode 358, a solution 360, an external emf source 362 and a meter 364 for measuring potential and or current with reference to the reference electrode. Solution 360 generally comprises an electrolyte and reactants that undergo a reduction reaction or an oxidation reaction at the appropriate electrodes. Electrodes 354, 356, 358, external emf source 362 and meter 364 have appropriate electrical connections between them. Specific solutions are described further below with respect to the specific examples.

Example 1

Magnetically Modified Carbon Paste Electrodes

This example demonstrates improved performance of magnetically modified carbon paste electrodes.

1-1 Magnetically Modified Carbon Paste Electrode Preparation

Magnetically modified carbon paste electrodes were constructed in four steps. First, a cylinder to contain a magnetically modified carbon paste mixture was constructed. Next, the carbon paste mixture was prepared. Third, the carbon paste mixture was introduced into the cylinder. Fourth, a platinum wire was inserted into the carbon paste mixture to electrically connect the carbon paste mixture and the leads of the potentiostat.

Fischerbrand® 2 mL disposable polyethylene transfer pipettes were cut at the 0.25 ml mark to provide a tapered cylinder approximately 4.5 cm long and open at both ends. The "active" end of electrode at the tapered end with a diameter of roughly 1.5 mm and the "top" of the electrode at the end of the tapered cylinder with the larger opening. A thumbtack was used to puncture a hole at a lip of the cylinder perpendicular to a long axis near the top of the electrode. The punctured hold was used as a pressure fitting to secure the platinum wire.

To prepare the magnetically modified carbon paste mixture, magnetic particles (approximately 18 mg siloxane coated iron oxide particles) were weighed and transferred to a 2 mL polypropylene microcentrifuge tube (with cap). Next, an electrically conductive platinized carbon black powder was transferred to a mortar and ground vigorously with a pestle for approximately 1 minute. The ground material (approximately 27 mg) was then transferred to the microcentrifuge tube containing the magnetic particles. The magnetically modified carbon paste mixture of magnetic particles and platinized carbon black was then mixed vigorously.

The microcentrifuge tube was mounted on a stand to keep it upright. The microcentrifuge tube was placed on a balance and mineral oil was introduced into the tube in 5 to 10 microliter volumes until approximately 105 mg of the mineral oil was added to the microcentrifuge tube. The mineral oil was enabled to "soak" into the powders for about thirty minutes. Finally, the wooden end of a cotton swab was used to mix the paste thoroughly.

The tapered cylinder was grasped at the top and pushed into the paste at the bottom of the microcentrifuge tube. This was repeated until enough paste was introduced into the bottom of the tapered cylinder to ensure the platinum wire did not come into contact with the solution (1.5 cm column of carbon paste).

The magnetically modified carbon paste electrode was completed when a platinum wire was pushed through the hole at the top of the tapered cylinder until contact was made between the platinum wire and the magnetically modified carbon paste mixture at the bottom of the tapered cylinder. The platinum wire extended roughly 5 mm into the column of paste. A Kimwipes® task wiper was used to wipe the bottom of the electrode, such that the paste surface was flush with end of the pipette tip. The completed magnetically modified carbon paste electrodes were placed on a NdFeB magnet overnight to ensure that the superparamagnetic particles held a local magnetic field when placed in solution.

Specifications for the magnetically modified carbon paste electrodes are listed in Table 1.

TABLE 1

MICE-Pastes and Conductive Paste Electrodes: Composition by Component Weight (g) and Weight Percent Total Solids

| Electrode ID | Particulates | XC-72 | Mineral Oil | Wt. % Solids |
|---|---|---|---|---|
| 40 wt. % Magnets | | | | |
| AV1 | 0.0160 | 0.0244 | 0.0939 | 30.1% |
| AV2 | 0.0165 | 0.0243 | 0.0944 | 30.2% |
| AV3 | 0.0179 | 0.0266 | 0.1063 | 29.5% |
| | | | Average | 29.9 ± 0.4% |
| 20 wt. % $Al_2O_3$ | | | | |
| AW1 | 0.0084 | 0.0345 | 0.1014 | 29.7% |
| AW2 | 0.0080 | 0.0322 | 0.0935 | 30.1% |
| AW3 | 0.0097 | 0.0390 | 0.1127 | 30.2% |
| | | | Average | 30.0 ± 0.3% |
| No Particulates | | | | |
| AX1 | — | 0.0441 | 0.1013 | 30.3% |
| AX2 | — | 0.0399 | 0.1082 | 26.9% |
| AX3 | — | 0.0428 | 0.993 | 30.1% |
| | | | Average | 29.1 ± 1.9% |

All electrodes contained ~30 wt. % solids. In the AV electrodes, 40 wt. % of the solids are magnets; in AW, 20 wt. % of the solids are $Al_2O_3$. The remainder of the solids is platinized Vulcan XC-72.

1-2 Magnetically Modified Carbon Paste Electrode Results

The objective with magnetically modified carbon paste electrodes was to establish a sufficient field at the electrode surface at which the current density was enhanced. To determine current density, or relative current density, it was necessary to determine relative electrode area. Here, the relative electrode area was estimated as proportional to the double layer capacitance in a solution containing no redox probe. The relative current density was estimated by normalizing voltammetric responses with a redox probe in solution by the relative area represented by the double layer capacitance.

Magnetically modified carbon paste electrodes exhibited enhanced electrochemical flux (i.e., larger current per unit area of active electrode surface) compared to electrodes prepared with no magnetic content. The magnetic system was more efficient than the nonmagnetic under electrolysis conditions, as a larger current with no increased expenditure of energy generally corresponds to a higher efficiency.

1-2-1 Instrumentation

Electrochemical measurements were made using a BAS 100B Electrochemical Workstation. Electrochemical cells utilized a high surface area platinum mesh counter electrode and a saturated calomel electrode (SCE) as the reference. Background measurements using chronoamperometry and cyclic voltammetry were made in nitrogen-purged 0.10 M $Na_2SO_4$ electrolyte solution. Cyclic voltammetric measurements were also made in a solution of 1.0 mM $Ru(bpy)_3^{2+}$ (tris(2,2'-bipyridyl) dichlororuthenium (II) hexahydrate) (Aldrich) in 0.10 M $HNO_3$.

Prior to taking any measurements in the 0.10 M $Na_2SO_4$ electrolyte solution, each electrode was preconditioned by cycling at 500 mV/s between −700 and 1200 mV vs. SCE for 100 cycles. The electrode was then scanned through the same potential window at 100 mV/s; three 500 mV potential step (−200 mV to 300 mV vs. SCE) measurements were then taken. The electrodes were placed in the solution of 1.0 mM $Ru(bpy)_3^{2+}$ in 0.10 M $HNO_3$ and voltammograms recorded 5, 10, and 15 mV/s. Voltammograms were recorded in random order and three traces collected at each scan rate. A minimum of two minutes elapses between measurements.

1-2-2 Estimates of Relative Electrode Area

As described, magnetic modification of electrode surfaces increased the electrochemical flux at an electrode surface. The surface areas of the electrodes was estimated as being proportional to the double layer capacitance ($C_d$) as determined from chronoamperometry measurements made in blank electrolyte solution. The double layer capacitance ($C_d$) was determined from 500 mV potential steps and the equation for the simple RC circuit model of the cell.

$$i(t) = \frac{E}{R_s}\exp\left[-\frac{t}{RC}\right] \quad (1)$$

where i is the current (A), E is the magnitude of the potential step (V), $R_s$, is the uncompensated resistance of the cell (Ω), and t is the time (s). RC is the time constant of the cell with units of resistance times capacitance, which is evaluated from the measurements.

The data was analyzed from the linear region of the current response from 0.25 to 2.0 ms. The $C_d$ measurements are listed in Table 2.

TABLE 2

Double Layer Capacitance ($C_d$) and Resistance Determined for MICE-Pastes, Mice-Epoxies, and Controls

| Electrode ID | n | $R_s(\Omega)$ | $C_d(\mu F)$ |
|---|---|---|---|
| MICE-Pastes | | | |
| 40 wt. % Magnets | | | |
| AV1 | 3 | 12200 | 17.3 |
| AV2 | 3 | 6600 | 18.3 |
| AV3 | 3 | 12100 | 12.9 |
| | | Average | 16.1 (±2.9) |
| 20 wt. % $Al_2O_3$ | | | |
| AW1 | 3 | 2400 | 34.3 |
| AW2 | 3 | 18000 | 21.5 |
| AW3 | 3 | 2820 | 72.5 |
| | | Average | 42.6 (±26.4) |
| No Particulates | | | |
| AX1 | 3 | 3300 | 25.2 |
| AX2 | 3 | 1600 | 58.8 |
| AX3 | 3 | 3190 | 33.4 |
| | | Average | 39.2 (±17.5) |
| MICE-Epoxies | | | |
| 50 wt. % Magnets | | | |
| M1 | 3 | 106.7 | 10.0 |
| M2 | 3 | 89.2 | 10.6 |
| M3 | 3 | 77.6 | 11.9 |
| M4 | 3 | 72.1 | 11.6 |
| | | Average | 11.1 (±0.9) |
| 43 wt. % $Al_2O_3$ | | | |
| A1 | 3 | 103.9 | 14.2 |
| A2 | 3 | 144.5 | 13.6 |
| A3 | 3 | 71.1 | 13.6 |
| A4 | 3 | 72.9 | 13.0 |
| | | Average | 13.6 (±0.5) |
| No Particulates | | | |
| B1 | 3 | 57.3 | 17.0 |
| B2 | 3 | 72.4 | 14.6 |
| B3 | 3 | 121.3 | 16.6 |

TABLE 2-continued

Double Layer Capacitance ($C_d$) and Resistance Determined for MICE-Pastes, Mice-Epoxies, and Controls

| Electrode ID | n | $R_s(\Omega)$ | $C_d(\mu F)$ |
|---|---|---|---|
| B4 | 3 | 59.8 | 19.3 |
|  |  | Average | 16.9 (±1.9) | n is the number of replicates for a given electrode.
Standard deviations are listed in parentheses.

The relative uncertainties for $C_d$ were relatively high. The electrodes were heterogeneous, as they comprised two or three immiscible components. The heterogeneity and the limited number of replicates lead to the high relative uncertainty. The area of the 40 wt. % magnets electrode was lower than might be anticipated based on the areas of the nonmagnetic electrodes. If the composition of the electrode surface reflected the composition of the paste, the area and thus $C_d$ for the magnetic electrode should have been less than about sixty percent of that for the electrode containing no particulate. For the magnetic electrodes, $C_d$ was substantially smaller. The magnetic microparticles were magnetic and attracted to each other. If the magnetic particles agglomerated at the surface, a lower electroactive area and a correspondingly lower $C_d$ resulted. Such agglomeration might explain the lower $C_d$ found for the magnetic electrodes.

1-2-3 Faradaic Behavior

Each of the electrodes was introduced into a three electrode cell containing 1.0 mM Ru(bpy)$_3{}^{2+}$ in 0.1M HNO$_3$ and cyclic voltammograms were collected as described above. The peak current of the oxidation (forward) wave (Ru(bpy)$_3{}^{2+}$ to Ru(bpy)$_3{}^{3+}$) was measured at three scan rates and in triplicate, as described above. The redox species were assumed to not be partitioning into the carbon paste. This was demonstrated by the fact the electrodes used in the study have voltammograms depicting the expected nonfaradaic capacitive background for scans in blank electrolyte solutions subsequent to exposure to redox species such as tris(2,2'-bipyridyl) dichlororuthenium (II) hexahydrate.

Figure 8:
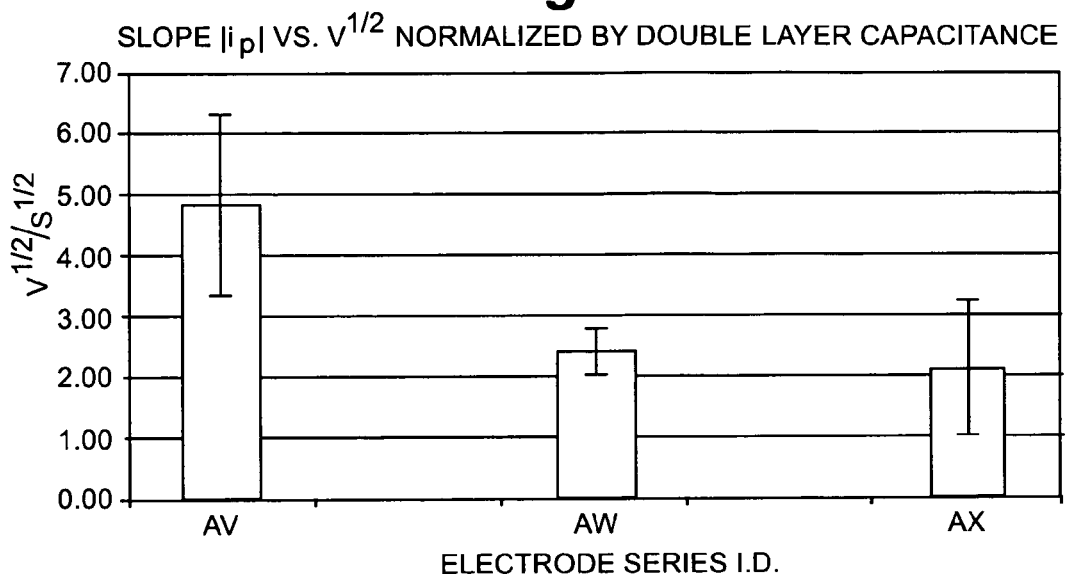
FIG. 8 is a plot of the average of the slopes of $i_p$ vs. $v^{1/2}$ normalized by the double layer capacitance and associated standard deviation of three electrodes: (1) 40 wt. % magnets (AV), (2) 20 wt. % $Al_2O_3$ (AW), and (3) no particulates (AX).

Referring to FIG. 8, cyclic voltammograms are depicted for a magnetically modified carbon paste electrode and nonmagnetic carbon paste electrodes with and without aluminum oxide particles. The voltammograms, recorded at 10 mV/s, were normalized by the double layer capacitance found by potential step. This was used to determine the current per active area of the electrode. The two controls ((1) blank containing Vulcan XC-72 and (2) Al$_2$O$_3$ composite) yielded similar current densities, expected for electrodes of equal area and no magnetic field.

The magnetically modified carbon paste electrode yielded a current density that was approximately double that of the control electrodes, which was consistent with a magnetic field effect on the measured current. The peak splitting was larger than the expected 58.7 mV for reversible electron transfer reactions. The redox probe Ru(bpy)$_3{}^{2+}$, was a reversible electron transfer reagent at these scan rates. The peak splitting reflected the resistance of the electrodes. The resistance was nonzero for all electrodes. The magnetic electrode exhibited a larger resistance than the two controls, which have comparable resistances.

The impact of the magnetic field was more quantitatively assessed by considering the cyclic voltammetric peak currents on the forward scan. The peak current, $i_p$ (A) was a measure of the total electrochemical flux. For a reversible electron transfer at 25° C., $$i_p = (2.69 \times 10^5) n^{3/2} A D_o{}^{1/2} v^{1/2} C_o{}^* \qquad (2)$$

where n is the number of electrons per molecule oxidized or reduced, A is the surface area of the electrode (cm$^2$), $D_o$ is the diffusion coefficient of the redox species (cm$^2$/s), v is the linear scan rate (V/s), and $C_o{}^*$ is the concentration of the redox species (mol/cm$^3$).

Plots of $i_p$ vs. $v^{1/2}$ yielded the slopes that are listed in Table 3.

TABLE 3

Slope of $|i_p|$ vs $\sqrt{v}$ for MICE-Pastes, MICE-Epoxies, and Control Electrodes and the Average for Each

| Electrode ID | Slope of $\|i_p\|$ vs $\sqrt{v}$ | Slope of $\|i_p\|$ vs $\frac{C_d}{v^{1/2}s^{-1/2}}$ |
|---|---|---|
| MICE-Pastes |  |  |
| 40 wt. % Magnets |  |  |
| AV1 | 17.6 | 1.02 |
| AV2 | 19.1 | 1.05 |
| AV3 | 18.4 | 1.43 |
| Average | 18.4 (±0.7) | 1.16 (±0.23) |
| 20 wt. % Al$_2$O$_3$ |  |  |
| AW1 | 32.7 | 0.95 |
| AW2 | 16.9 | 0.79 |
| AW3 | 40.9 | 0.57 |
|  | 36.8 (±5.8) | 0.77 (±0.19) |
| No Particulates |  |  |
| AX1 | 24.7 | 0.98 |
| AX2 | 31.6 | 0.54 |
| AX3 | 23.9 | 0.71 |
| Average | 28.5 (±4.9) | 0.74 (±0.22) |
| MICE-Epoxies |  |  |
| 50 wt. % Magnets |  |  |
| M1 | 7.85 | 0.782 |
| M2 | 7.95 | 0.749 |
| M3 | 8.08 | 0.679 |
| M4 | 7.88 | 0.676 |
| Average | 7.94 (±0.10) | 0.721 (±0.052) |
| 43 wt. % Al$_2$O$_3$ |  |  |
| A1 | 8.18 | 0.575 |
| A2 | 7.75 | 0.569 |
| A3 | 8.17 | 0.601 |
| A4 | 8.45 | 0.649 |
| Average | 8.13 (±0.29) | 0.599 (±0.036) |
| No Particulates |  |  |
| B1 | 8.81 | 0.517 |
| B2 | 8.87 | 0.609 |
| B3 | 8.27 | 0.498 |
| B4 | 8.71 | 0.451 |
| Average | 8.67 (±0.27) | 0.518 (±0.066) |

Standard deviations are listed in parentheses.

Figure 9:
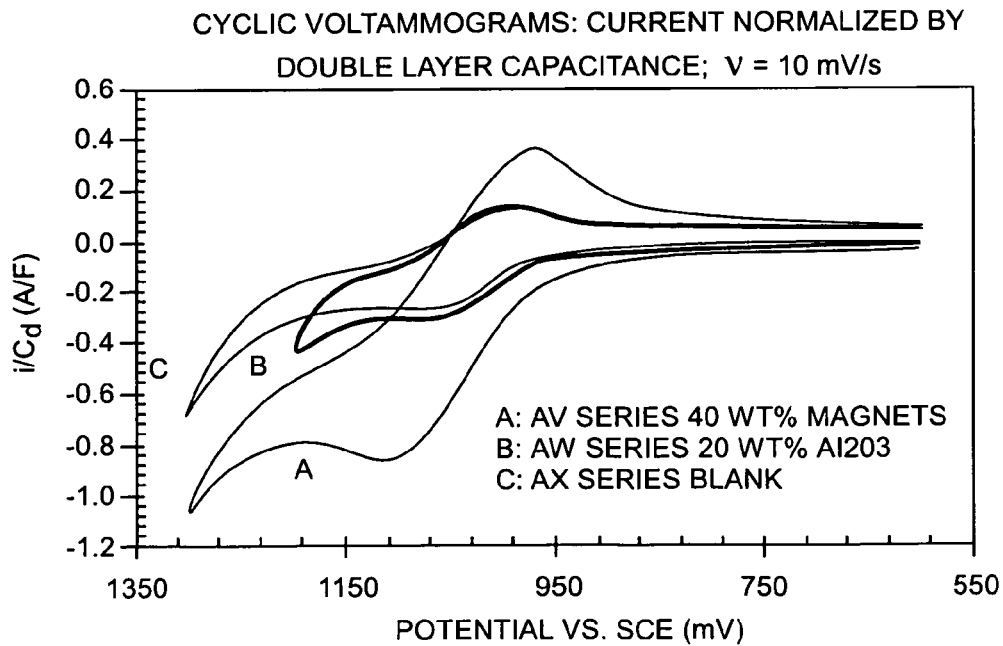
FIG. 9 is a Cyclic Voltammogram (CV) plot where the current has been normalized by the double layer capacitance for the three electrodes: (1) 40 wt. % magnets (AV), (2) 20 wt. % $Al_2O_3$ (AW), and (3) no particulates (AX).

These slopes were normalized by the measured $C_d$ of each electrode to provide an estimate of the electrochemical flux per unit area of each of the electrodes. The normalized values and their standard deviation are listed in Table 3. Bar graphs of these values and associated variations are depicted in FIGS. 7 and 9 for MICE-Pastes and MICE-Epoxies, respectively.

1-2-4 Enhanced Flux of MICE-Paste

Figure 7:
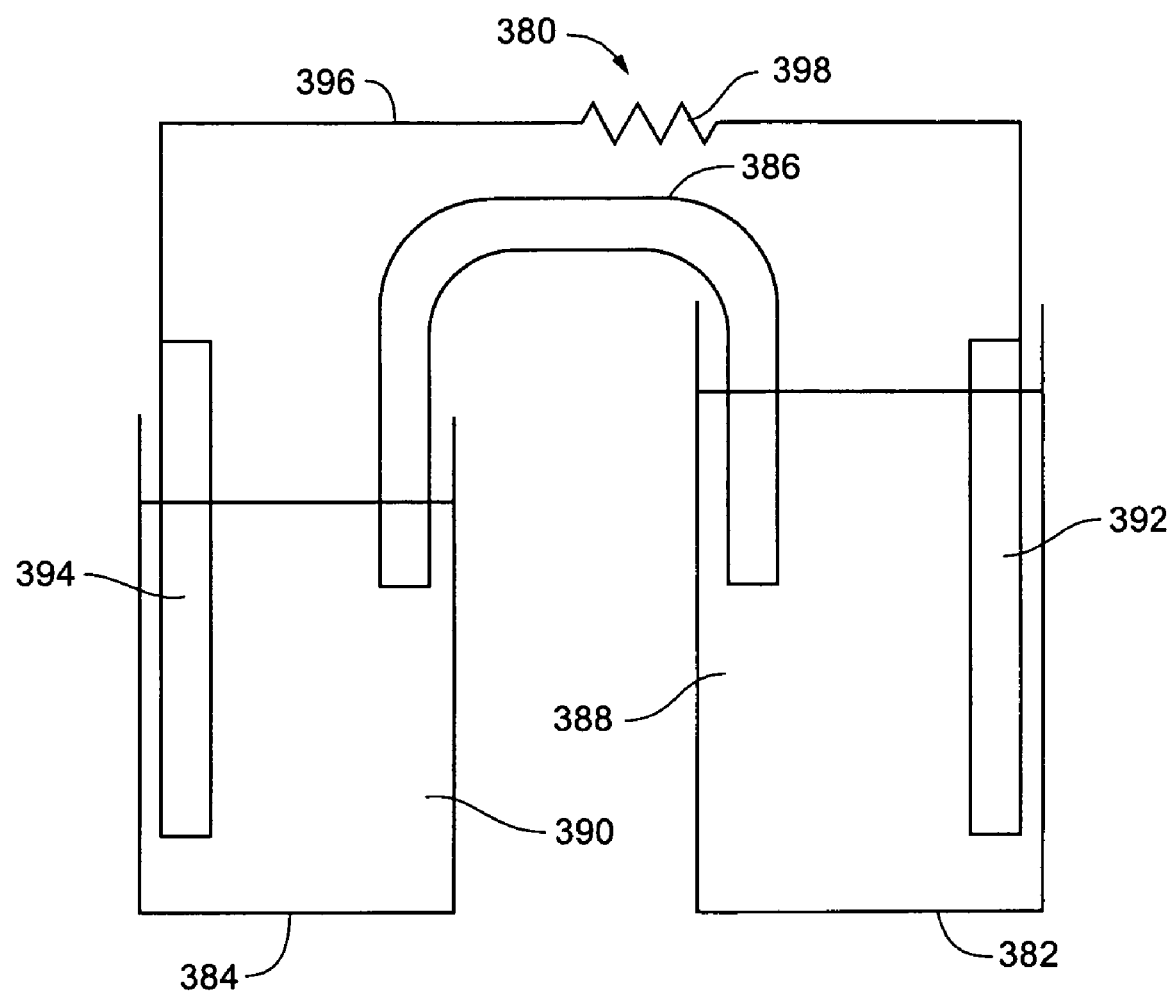
FIG. 7 is a sectional side schematic view of a reaction system with two separate reactant vessels separating spontaneous reactants with a salt bridge connecting the reactant vessels in which the system has at least one magnetically modified electrochemically inert electrode.

The results listed in Table 3 and depicted in FIG. 7 illustrate that magnetically modified carbon paste electrodes have a higher electrochemical flux through their electroactive area than control carbon paste electrodes. For this set of conditions, roughly a one hundred percent increase in flux was observed for magnetically modified carbon paste electrodes over the controls. This value was about half the enhancement observed for electrodes modified with iron oxide particle/Nafion® composites containing roughly fifteen percent by volume paramagnetic material tested with the same redox couple under similar conditions.

If the electrochemical performance of AW and AX electrodes were considered part of the same population (CPEs), then student-t analysis suggests there was >99.7% chance the magnetically modified carbon paste electrodes were not part of that population when considering $i_p$ vs.$v^{1/2}$ normalized by $C_d$. This was in marked contrast to a set of magnetically modified carbon paste electrodes run alongside the AW series and similar to the AW series, however, only 20 wt. % of the solids consisted of magnetic particles. This set of electrodes gave nearly identical performance to that of the control and blank carbon paste electrodes. Perhaps only a small fraction of the platinum metal available to react at the surface was under the influence of the magnetic fields sustained by the iron oxide particles.

Example 2

Magnetically Modified Epoxy Carbon Electrodes

This examples demonstrates improved performance of magnetically modified epoxy carbon electrodes.

2-1 Magnetically Modified Epoxy Carbon Electrode Preparation

As described in this example, magnetically modified epoxy carbon electrodes were rigid conducting composites comprising electrically conducting graphite powder (Aldrich) and siloxane coated magnetic particles suspended in a chemically inert polymer matrix. The chemically inert matrix the electrode materials were fixed within was a low viscosity epoxy (Polyscience). The controls for the experiment were electrodes consisting of epoxy and graphite and electrodes comprising epoxy, graphite, and siloxane-coated $Al_2O_3$ particles.

Magnetically modified epoxy carbon electrodes were prepared in a similar manner to the paste electrodes described above, although the matrix was an epoxy that was mixed with an electrical conductor. Following construction of the electrode, the epoxy was enabled to cure until the matrix was solid.

Graphite and $Fe_3O_4$ particles were homogeneously dispersed in the matrix prior to introducing the epoxy. Epoxy is generally sold commercially in two parts: (1) a resin and (2) a hardener. The resin was added to the graphite and $Fe_3O_4$ particle mixture and then hand-mixed. The hardener was then added to the mixture, which was then thoroughly mixed to obtain a homogeneous paste. The paste was then mounted within a Teflon® tube with an inner diameter of 3 mm and electrical contact was established by introducing a platinum wire into the paste within the tube. The electrode was then cured at 60° C. for 24 hours. Following curing, the surface of electrodes were polished with sand paper and rinsed thoroughly with distilled water.

The electrodes comprised about 65 wt. % in graphite and magnetic particulates. Where magnetic particulates were present, about 35 wt. % to about 40 wt. % of the non-epoxy solids comprised particulates. The remaining mass of the electrode comprised equal amounts of the two epoxy components. Specifications for the electrodes used in this study are listed in Table 4.

TABLE 4

MICE-Epoxies and Conductive Epoxy Electrodes: Composition by Component Weight (g) and Weight Percent Total Solids

| Electrode ID | Particulates | Graphite | Resin | Hardener | Wt. % Non Epoxy |
|---|---|---|---|---|---|
| 50 wt. % Magnets | | | | | |
| M1 | 0.0999 | 0.1011 | 0.0388 | 0.0401 | 71.8 |
| M2 | 0.1018 | 0.1024 | 0.0416 | 0.0372 | 72.2 |
| M3 | 0.0998 | 0.1008 | 0.0405 | 0.0387 | 71.7 |
| M4 | 0.0999 | 0.1025 | 0.0408 | 0.0392 | 71.6 |
| | | | | Average | 71.8 (±0.1%) |
| 43 wt. % $Al_2O_3$ | | | | | |
| A1 | 0.0772 | 0.1019 | 0.0384 | 0.0418 | 69.1 |
| A2 | 0.0777 | 0.1014 | 0.0301 | 0.0423 | 69.3 |
| A3 | 0.0773 | 0.1020 | 0.0401 | 0.0440 | 68.1 |
| A4 | 0.0777 | 0.1004 | 0.0396 | 0.0430 | 68.3 |
| | | | | Average | 68.7 (±0.4%) |
| No Particulates | | | | | |
| B1 | — | 0.1398 | 0.0392 | 0.0407 | 63.6 |
| B2 | — | 0.1404 | 0.0398 | 0.0424 | 63.1 |
| B3 | — | 0.1412 | 0.0380 | 0.0395 | 64.5 |
| B4 | — | 0.1408 | 0.0407 | 0.0399 | 63.5 |
| | | | | Average | 63.7 (±0.6%) |

Magnetically modified epoxy carbon electrodes and the $Al_2O_3$ control electrodes were produced as triplicates. One graphite electrode containing no particulates was also made for use as a control.

2-2 Magnetically Modified Epoxy Carbon Results

The objective with MICE-Epoxy was the same as discussed in the MICE-Paste, i.e., to establish a sufficient field at the electrode surface that the current density was enhanced by the field. To determine current density, or at least relative current density, it was necessary to determine relative electrode area. Here, the electrode area of the electrodes was estimated as proportional to the double layer capacitance measured in either a solution containing no redox probe or in the nonfaradaic potential region of a $Ru(bpy)_3^{2+}$ and $HNO_3$ solution. The relative current density was estimated by normalizing voltammetric responses with a redox probe in solution by the relative area represented by the double layer capacitance.

2-2-1 Instrumentation

Electrochemical measurements were made using a CH Instruments 1030 Electrochemical Analyzer. All electrochemical cells utilize a high surface area platinum mesh counter electrode and a Ag/Ag-oxide (Ag metal wire polished with sandpaper and dipped in concentrated $HNO_3$) was used as a quasi-reference electrode. Background measurements using chronoamperometry and cyclic voltammetry were made in a nitrogen purged 0.50 M $HNO_3$ electrolyte solution. Prior to taking any measurements in the 0.50 M $HNO_3$ electrolyte solution, each electrode was preconditioned by cycling at 100 mV/s between −400 and 1200 mV vs. Ag/Ag-oxide for 20 cycles. Background voltammograms for each electrode were recorded over the same potential window at 10 mV/s and 100 mV/s and three potential steps (two 100 mV steps and a 150 mV step) measurements were then taken. Then, the electrodes were transferred to a solution of 5.0 mM $Ru(bpy)_3^{2+}$ in 0.50 M $HNO_3$, cyclic voltammograms recorded, and chronoamperometric measurements taken in a potential range where no faradaic processes occur.

2-2-2 Estimates of Relative Electrode Area

The same methods for determining the double layer capacitance and relative electrode were for MICE-Paste data were used to analyze the data for MICE-Epoxy. However, for MICE-Epoxy the chronoamperometry data was collected from a pooled set of measurements (100 mV and 150 mV potential steps) in blank electrolyte and in the nonfaradaic potential region of a $Ru(bpy)_3^{2+}$ in $HNO_3$ solution. Measurements of $C_d$ for MICE-Epoxy, and control electrodes are listed in Table 2.

2-2-3 Faradaic Behavior

The Faradaic behavior of MICE-Epoxy was probed under slightly different conditions than that for MICE-Paste. For the $MICE_{epoxy}$ each of the electrodes was introduced into a three electrode cell containing 5.0 mM $Ru(bpy)_3^{2+}$ in 0.5M $HNO_3$, then, cyclic voltammograms collected. The peak current of the oxidation (forward) wave ($Ru(bpy)_3^{2+}$ to $Ru(bpy)_3^{3+}$) was measured at three scan rates, and in triplicate.

Figure 10:
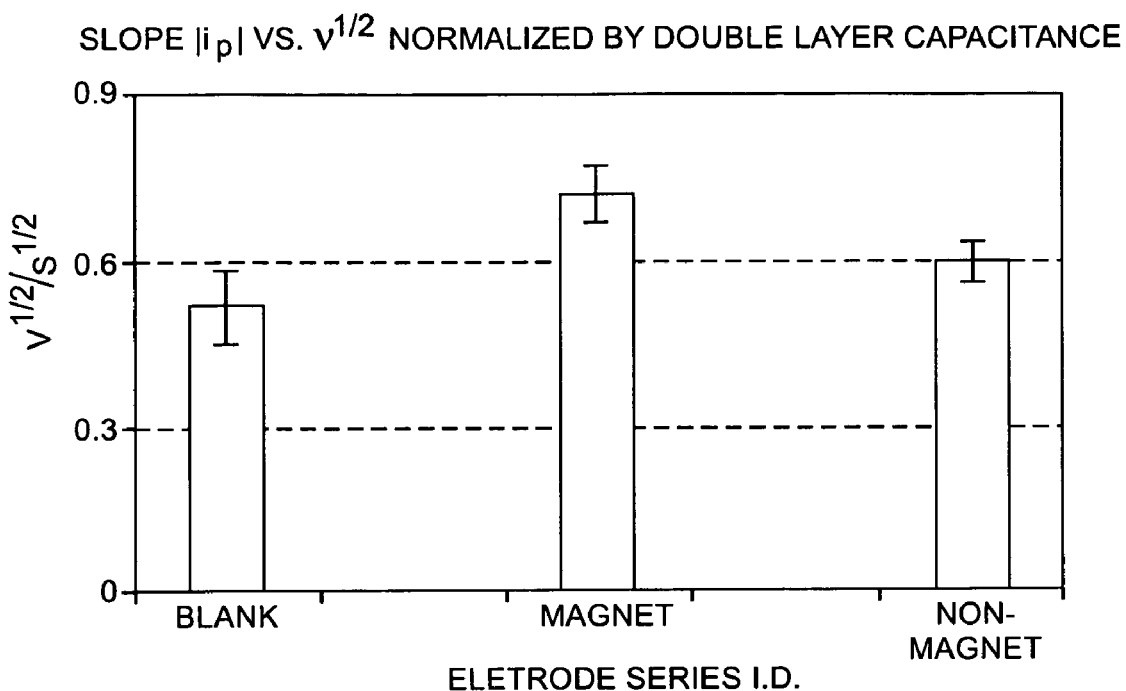
FIG. 10 is a plot of the average of the slope of $i_p$ vs. $v^{1/2}$ normalized by the double layer capacitance for the three electrodes: (1) 40 wt. % magnets (Magnet), (2) 35 wt. % $Al_2O_3$ (Non-Magnet), and (3) no particulates (Blank).
Figure 11:
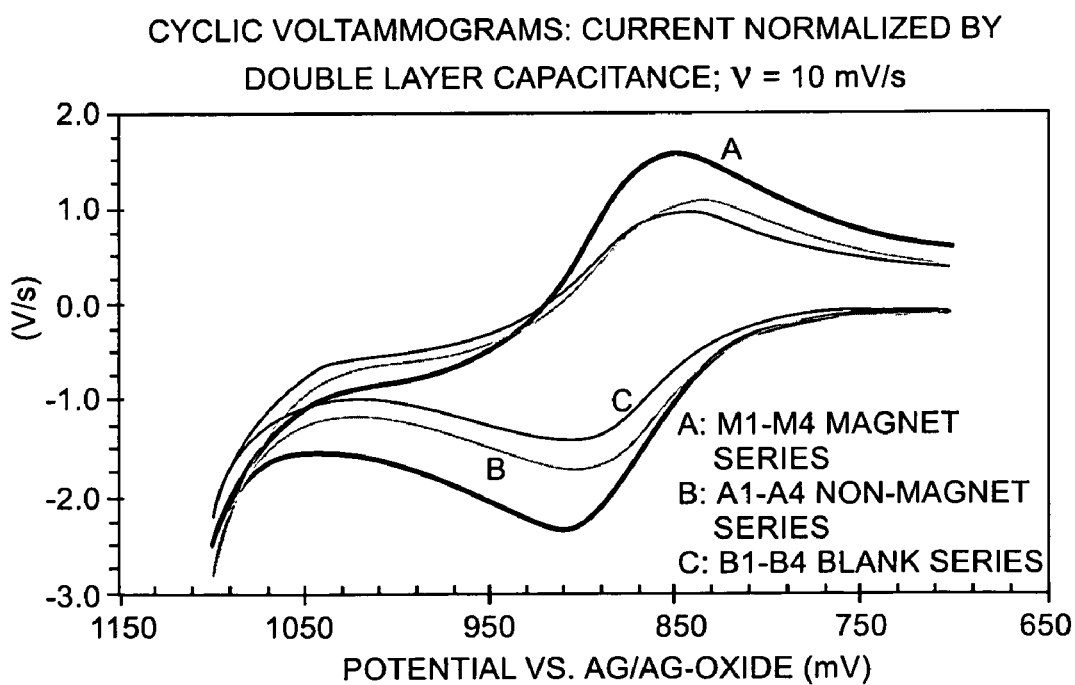
FIG. 11 is a Cyclic Voltammogram (CV) plot where the current has been normalized by the double layer capacitance for the three electrodes: (1) 40 wt. % magnets (Magnet), (2) 35 wt. % $Al_2O_3$ (Non-Magnet), and (3) no particulates (Blank).

FIG. 10 depicts the cyclic voltammetric (CV) data for the MICE-Epoxy with controls (i.e., without aluminum oxide particles). All voltammograms, recorded at 10 mV/s, were normalized by the double layer capacitance found by potential step. This determines the current per active area of the electrode. The behavior of MICE-Epoxy mirrored that of the MICE-Paste. All of the controls (CPEs and ECEs with $Al_2O_3$ or no particulates) yield similar current densities, as expected for electrodes of equal area and no magnetic field. Both the MICE-Paste and MICE-Epoxy yielded current densities that were approximately double that of the controls, consistent with a magnetic field effect on the measured current.

In contrast to MICE-Paste, the peak splitting for the MICE-Epoxy and related controls were near the ideal 58.7 mV. This was consistent with the resistance of this set of electrodes having roughly 10% the electrical resistance of the MICE-Paste.

MICE-Epoxy cyclic voltammetric data was processed in the same manner as described in the MICE-Paste Faradaic Behavior section, and plots of $i_p$ vs. $v^{1/2}$ yield the slopes reported in Table 3 for MICE-Epoxy and control electrodes. These slopes were normalized by the measured $C_d$ of each electrode to provide an estimate of the electrochemical flux per unit area of each of the electrodes. The normalized values and their standard deviation are listed in Table 3. Bar graphs of these values and associated variations are depicted in FIGS. 7 and 9 for MICE-Pastes and MICE-Epoxies, respectively.

2-2-4 Enhanced Flux of MICE-Epoxy

The results listed in Table 3 and illustrated in FIGS. 7 and 9 depict that MICE-Epoxy have a higher electrochemical flux through their electroactive area than control electrodes. The relative enhancement of the MICE-Epoxy was roughly a one-hundred percent increase in flux over the controls. This value was similar to the performance of the MICE-Paste over the controls and about half the enhancement observed for electrodes modified with iron oxide particle/Nafion composites containing roughly fifteen percent by volume superparamagnetic material tested with the same redox couple under similar conditions.

Considering the MICE-Epoxy, when grouping the performance of electrode "Non-Magnet" with the "Magnet" series as blanks and comparing the performance to that of the magnetically modified electrodes, student-t analysis suggests there was greater than 94.7% chance that the MICE-Epoxy were not part of that population when considering $i_p$ vs. $v^{1/2}$ normalized by $C_d$.

Example 3

Magnetically Modified Carbon Pressed Electrodes 3-1 Magnetically Modified Carbon Pressed Electrode Preparation MICE-Pressed were constructed by shaping a pellet comprising electronically conductive particles, magnetic particles coated with a chemically inert covering and a binding agent.

The electrode was completed when the pellet made electrical contact with a conducting lead, such as platinum metal or carbon cloth. The lead was used to connect the electrode to a control device, such as a potentiostat. Teflon® powder was used as a binding agent comprising between about 20 wt. % and about 40 wt. % of the pellet. The magnetic materials used in the electrodes were the same magnetic microparticles described above. The magnetic material can comprise up to about 50 wt. % of the electrode. Graphite and glassy carbon powders were used as the electronically conductive material.

The pellet was formed after the components were thoroughly mixed and placed into a die. The die consisted of three stainless steel parts: (1) a cylinder with inner diameter of 1 cm, (2) a foot, and (3) a plunger that formed a space in middle of the cylinder, such as described above in FIG. 3. To make the pellet, the foot was placed inside the cylinder and the pellet components introduced into the cavity. Next, the plunger was introduced into the top of the cylinder and the die and components were placed into a hydraulic press. Pressure was then applied to the die. Pellets used in this example experienced pressures varying from 1 to 4 metric tons. Pellets had thicknesses between 0.1-0.2 cm and a diameter of 1 cm.

Following pellet formation, the pellet was fixed into a rigid polymer housing made from Teflon® polymer. The geometry of the housing was such that one face of the pellet made contact with the solution of an electrochemical cell while the opposite face of the pellet was in contact with an electrical conductor. Epoxy was applied to the seam between the pellet and Teflon® housing to seal the electrode. The MICE-Pressed was complete after the pellet and electrical conductor made contact and the electrode was sealed.

3-1 Magnetically Modified Carbon Pressed Results

MICE-Pressed made with graphite powder (particle size 1-2 μm) resulted in electrodes having better mechanical stability than electrodes made with glassy carbon powder (particle size 2-12 μm). Electrode constructions lacking a binding agent had higher porosity. The porous structure permitted solvent to penetrate through the electrode structure that disrupts the stability of the pellet. Temperature studies suggested that pellets pressed at higher temperature (e.g., greater than 80° C.) were more stable than those pressed at room temperature.

The embodiments described above are intended to be illustrative and not limiting. Additional embodiments are within the claims. Although the present invention has been described with reference to preferred embodiments, workers skilled in the art will recognize that changes may be made in form and detail without departing from the spirit and scope of the invention.

What is claimed is:

1. An electrochemical cell comprising a tank, a first electrode, a second electrode, an electrical connection with an emf source to provide an emf across the electrodes, a solution within the tank in effective contact with the first electrode and the second electrode wherein the solution comprises an electrolyte and reactants that can form product compositions in response to the emf and wherein at least one of the first electrode and the second electrode is a magnetically modified electrode comprising a composite and a surface coating of electrical conductor, the composite comprising magnetic particles and at least about 10 weight percent electrically conductive particles, and the surface coating covering at least about 20 percent of the electrode surface area, wherein the surface coating does not comprise a magnetic coating.

2. The electrochemical cell of claim 1 wherein the composite comprises at least about 25 weight percent electrically conductive particles.

3. The electrochemical cell of claim 1 wherein the electrically conductive particles comprise carbon particles.

4. The electrochemical cell of claim 1 wherein the composite comprises at least about 10 weight percent magnetic particles.

5. The electrochemical cell of claim 1 wherein the composite comprises at least about 20 weight percent magnetic particles.

6. The electrochemical cell of claim 1 wherein the magnetic particles comprise a composition selected from the group consisting of $Sm_2Co_{17}$, $SmCo_5$, NdFeB, $Sm_2Co_7$, $La_{0.9}Sm_{0.1}Ni_2Co_3$, $Ti_{0.51}Zr_{0.49}V_{0.70}Ni_{1.18}Cr_{0.12}$, $Fe_3O_4$, $Fe_2O_3$, an any combination thereof.

7. The electrochemical cell of claim 1 wherein the composite comprises at least about 10 weight percent binder.

8. The electrochemical cell of claim 1 wherein the binder comprises an epoxy.

9. The electrochemical cell of claim 1 wherein the composite comprises at least about 20 weight percent polymer binder.

10. The electrochemical cell of claim 1 wherein the electrolyte comprises an aluminum compound and wherein the emf is sufficient to reduce the aluminum compound to elemental aluminum.

11. The electrochemical cell of claim 1 wherein the magnetically modified electrode further comprises a current collector in electrical contact with the composite.

12. A electrode comprising a non-porous composite and a current collector in electrical contact with the composite, wherein the composite does not comprise a surface coating comprising magnetic particles, further wherein the composite comprises at least about 10 weight percent electrically conductive particles, at least about 0.5 weight percent magnetic particles, and an optional binder, and further wherein the composite comprises at least about 80 weight percent with respect to the combined weight of the electrically conductive particles, the magnetic particles and the binder.

13. The electrode of claim 12 wherein the current collector comprises a metal mesh embedded within composite.

14. An electrically conductive electrode comprising at least about 10 weight percent electrically conductive particles, magnetic particles and a surface coating of electrical conductor covering at least about 20 percent of the electrode surface area, wherein said surface coating does not comprise a magnetic coating.

15. The electrically conductive electrode of claim 14 wherein the coating comprises an elemental metal or alloy.

16. The electrically conductive electrode of claim 14 wherein the coating covers at least about 50 percent of the electrode surface.

17. The electrically conductive electrode of claim 14 wherein the coating has a thickness from about 0.1 millimeter to about 1 centimeter.

18. The electrically conductive electrode of claim 14 further comprising a polymer binder.

19. A method for performing electrochemical reactions, the method comprising transporting electrons involved in the electrochemical reactions through an electrochemically inert electrode comprising a composite and a surface coating of electrical conductor, wherein the composite comprises at least about 10 weight percent electrochemically inert, electrically conductive particles and at least about 0.5 weight percent magnetic particles, wherein the electrochemically inert electrode is electrochemically inert under the conditions of the electrochemical reactions, and further wherein the surface coating covers at least about 20 percent of the electrochemically inert electrode surface area and the surface coating does not comprise a magnetic coating.

20. The method of claim 19 wherein a counter electrode comprises at least about 10 weight percent electrochemically inert, electrically conductive particles and at least about 0.5 weight percent magnetic particles, wherein the counter electrode does not comprise a surface coating comprising magnetic particles.

21. The method of claim 19 wherein the electrode is in electrical contact with an electrolyte within a tank wherein the electrolyte comprises a reactant for the electrochemical reactions.

22. An electrochemical cell comprising a tank, a first electrode, a second electrode, an electrical connection with an emf source to provide an emf across the electrodes, a solution within the tank in effective contact with the first electrode and the second electrode wherein the solution comprises an electrolyte and reactants that can form product compositions in response to the emf and wherein at least of one the first electrode and the second electrode is a magnetically modified electrode comprising a composite and a surface coating of electrical conductor, wherein the composite comprises electrically conductive particles and magnetic particles, wherein the surface coating covers at least about 20 percent of the electrode surface area and the surface coating does not comprise magnetic particles, and further wherein the magnetically modified electrode exhibits an electrochemical flux per unit electroactive area at least about 20% relative to an equivalent electrochemical cell without magnetic particles within the electrode.

23. The electrochemical cell of claim 22 wherein the magnetically modified electrode exhibits an electrochemical flux per unit electroactive area at least about 50% relative to an equivalent electrochemical cell without magnetic particles within the electrode.

* * * * *

UNITED STATES PATENT AND TRADEMARK OFFICE
CERTIFICATE OF CORRECTION

| | |
|---|---|
| PATENT NO. | : 7,842,178 B2 |
| APPLICATION NO. | : 11/405268 |
| DATED | : November 30, 2010 |
| INVENTOR(S) | : Johna Leddy et al. |

It is certified that error appears in the above-identified patent and that said Letters Patent is hereby corrected as shown below:

Column 1, lines 17-18, reading: "The Government may have certain rights to this invention." should be changed to: "The Government has certain rights to this invention."

Signed and Sealed this
Twenty-second Day of February, 2011

David J. Kappos
*Director of the United States Patent and Trademark Office*